(12) United States Patent
De Muijnck

(10) Patent No.: US 10,226,059 B2
(45) Date of Patent: Mar. 12, 2019

(54) PROCESS FOR PRODUCING DARK BROWN NATURAL COCOA

(71) Applicant: OLAM INTERNATIONAL LIMITED, Singapore (SG)

(72) Inventor: Leanne De Muijnck, Milwaukee, WI (US)

(73) Assignee: OLAM INTERNATIONAL LIMITED, Singapore (SG)

(*) Notice: Subject to any disclaimer, the term of this patent is extended or adjusted under 35 U.S.C. 154(b) by 0 days.

(21) Appl. No.: 14/392,141

(22) PCT Filed: Jun. 4, 2014

(86) PCT No.: PCT/US2014/040786
§ 371 (c)(1),
(2) Date: Dec. 23, 2015

(87) PCT Pub. No.: WO2014/209551
PCT Pub. Date: Dec. 31, 2014

(65) Prior Publication Data
US 2016/0165918 A1    Jun. 16, 2016

Related U.S. Application Data

(60) Provisional application No. 61/839,100, filed on Jun. 25, 2013.

(51) Int. Cl.
*A23G 1/52* (2006.01)
*A23G 1/56* (2006.01)
(Continued)

(52) U.S. Cl.
CPC ............. *A23G 1/52* (2013.01); *A23G 1/0009* (2013.01); *A23G 1/0016* (2013.01); *A23G 1/56* (2013.01);
(Continued)

(58) Field of Classification Search
CPC .... A23G 1/002; A23G 1/0003; A23G 1/0006; A23G 1/0009; A23G 1/0016; A23G 1/047
See application file for complete search history.

(56) References Cited

U.S. PATENT DOCUMENTS 1,167,956 A * 1/1916 Walker ...................... A23L 3/40
                                                        241/18
1,855,026 A * 4/1932 Livingston ............... A23G 1/04
                                                        426/429
(Continued)

FOREIGN PATENT DOCUMENTS

EP          111614 A1 *  6/1984
JP      2010-150289 A    7/2010
(Continued)

OTHER PUBLICATIONS

B. W. Minifie, "Chocolate, Cocoa and Confectionery", Science and Technology Second Edition, Knechtel Research Sciences Inc., Chicago, U.S.A., 1980. 28 pages.
(Continued)

*Primary Examiner* — Michele L Jacobson
(74) *Attorney, Agent, or Firm* — Morgan Lewis & Bockius LLP

(57) ABSTRACT

Natural, dark brown cocoa products are disclosed. Processes for producing such natural, dark brown cocoa products are also disclosed, as well as foods including such cocoa products.

12 Claims, 7 Drawing Sheets

(51) Int. Cl.
*A23G 1/00* (2006.01)
*A23G 9/42* (2006.01)
*A23C 9/13* (2006.01)
*A23G 1/30* (2006.01)

(52) U.S. Cl.
CPC .............. *A23G 9/42* (2013.01); *A23C 9/1307* (2013.01); *A23G 1/002* (2013.01); *A23G 1/0023* (2013.01); *A23G 1/305* (2013.01); *A23V 2002/00* (2013.01)

(56) References Cited

U.S. PATENT DOCUMENTS

| | | | | |
|---|---|---|---|---|
| 2,278,471 | A * | 4/1942 | Musher | A23G 1/02 426/489 |
| 2,380,158 | A * | 7/1945 | Durrenmatt | A23G 1/02 426/262 |
| 2,428,802 | A * | 10/1947 | Jones | A23G 1/02 241/152.1 |
| 3,392,027 | A * | 7/1968 | Hess | A23L 27/28 426/431 |
| 3,754,466 | A * | 8/1973 | Taralli | A23G 1/02 99/348 |
| 3,754,928 | A * | 8/1973 | Haney | A23G 1/02 426/456 |
| 3,778,519 | A * | 12/1973 | Taralli et al. | A23G 1/02 426/459 |
| 3,923,847 | A * | 12/1975 | Roselius | B01D 11/0203 554/11 |
| 3,997,680 | A * | 12/1976 | Chalin | A23G 1/02 426/262 |
| 4,308,288 | A * | 12/1981 | Hara | A23G 1/047 426/285 |
| 4,338,349 | A * | 7/1982 | Franklin | A23G 1/047 426/285 |
| 4,435,436 | A | 3/1984 | Terink et al. | |
| 4,628,803 | A * | 12/1986 | Bonora | A23G 1/10 366/139 |
| 4,758,444 | A * | 7/1988 | Terauchi | A23G 1/02 426/593 |
| 4,861,615 | A * | 8/1989 | Wiedmann | A23G 1/04 426/631 |
| 5,009,917 | A | 4/1991 | Wiant et al. | |
| 5,114,730 | A * | 5/1992 | Ellis | A23G 1/02 426/593 |
| 5,152,212 | A * | 10/1992 | Chauveau | A23G 1/02 366/104 |
| 5,185,175 | A * | 2/1993 | Loh | A23G 1/042 426/631 |
| 6,025,002 | A * | 2/2000 | Holscher | A23G 1/02 426/511 |
| 6,403,133 | B1 * | 6/2002 | Barfuss | A23L 5/49 426/253 |
| 6,627,232 | B1 * | 9/2003 | Hammerstone, Jr. | A23G 1/02 424/725 |
| 6,810,794 | B2 * | 11/2004 | Murthy | A23N 12/083 99/355 |
| 7,968,140 | B2 * | 6/2011 | Kealey | A21D 2/36 426/631 |
| 9,375,024 | B2 * | 6/2016 | Bernaert | A23G 1/305 |
| 2004/0137122 | A1 | 7/2004 | Purtle et al. | |
| 2007/0196556 | A1 * | 8/2007 | Van Der Meer | A23G 1/0006 426/593 |
| 2009/0110774 | A1 | 4/2009 | Milici | |
| 2009/0130284 | A1 * | 5/2009 | Miller | A23G 1/002 426/541 |
| 2009/0269439 | A1 * | 10/2009 | Moulay | A23G 1/0006 426/45 |
| 2010/0151087 | A1 | 6/2010 | Dumarche et al. | |
| 2012/0027889 | A1 | 2/2012 | Portella | |
| 2015/0004303 | A1 * | 1/2015 | Gaca | A23G 1/002 426/631 |
| 2015/0118372 | A1 * | 4/2015 | Albus | A23G 1/0016 426/461 |
| 2016/0157507 | A1 * | 6/2016 | Anijs | A23G 1/56 426/631 |

FOREIGN PATENT DOCUMENTS

| | | |
|---|---|---|
| JP | 2011-136859 A | 7/2011 |
| WO | 2014/103415 A1 | 7/2014 |

OTHER PUBLICATIONS

Extended European Search Report dated Dec. 23, 2016, issued in European Application No. 14817583.9.
Australian Examination Report dated Jan. 10, 2017, issued in Australian patent application No. 2014303085.
International Search Report dated Nov. 3, 2014, issued in corresponding International Application No. PCT/US2014/040786.
International Preliminary Report on Patentability dated Jan. 7, 2016, in corresponding International Application No. PCT/US2014/040786.
Philippines Office Action issued in Application No. 1/2015/502831 dated Apr. 26, 2018.
European Office Action issued in Application No. 14 817 583.9 dated Dec. 4, 2017, 5 pages.
Japanese Office Action issued in Application No. 2016-521425 dated Mar. 29, 2018, with English translation.
Australian Examination Report issued in Application No. 2018200104 dated Jun. 28, 2018.
Australian Examination Report issued in Application No. 2018200103 dated Nov. 6, 2018.
English translation of Japanese Decision of Rejection issued in Application No. 2016-521425 dated Nov. 2, 2018.

\* cited by examiner

PROCESS FOR PRODUCING DARK BROWN NATURAL COCOA

CROSS-REFERENCE TO RELATED APPLICATIONS

This application is the U.S. National Phase of PCT/US2014/040786 filed Jun. 4, 2014, which claims priority to U.S. Provisional Patent Application 61/839,100 filed Jun. 25, 2013, the contents of the entirety of which are hereby incorporated by reference herein.

TECHNICAL FIELD

Methods for producing natural cocoa products are disclosed. Natural cocoa products including, but not limited to, cocoa cakes, cocoa powders, and food products including such cocoa products are disclosed.

BACKGROUND OF THE INVENTION

Cocoa bean processing includes fermenting harvested beans, drying the beans, de-hulling the beans to produce nibs, sterilizing the nibs, roasting the nibs, crushing the nibs into cocoa liquor, and optionally pressing the cocoa liquor to obtain cocoa butter and cocoa powder.

Traditionally, natural cocoa products are light brown in color and have a pH in the range of 5.1 to 6.0. A typical L-value of 10 grams of a natural cocoa in 30 grams of water measured with a Hunterlab colorimeter is 20 or higher, and a- and b-values are 8.5 and higher.

In order to generate darker and more reddish colors in cocoa products, a certain amount and type of alkali is added in an alkalization process. Alkalization is a process where cocoa products are alkalized under a certain amount of moisture, at a certain temperature, optionally under pressure, and for a certain amount of time. The alkalization process occurs in the presence of sodium, potassium, ammonium, or magnesium hydroxide or carbonate, for example and without limitation, potash ($K_2CO_3$). The alkalization process alters the flavor, color, and solubility of the cocoa powder in water Current commercial demands require a cocoa manufacturer to produce cocoa products in a broad palette of colors, flavors, or both. While each manufacturer understands that manipulation of processing conditions such as temperature, water content, duration of processing time, and pH will affect the color and flavor of the cocoa product, there is no general consensus as to how to produce a cocoa product of a consistently desirable color, flavor, or both.

While the alkalization process may be used to produce darker and/or more reddish cocoa products, the presence of the alkalizing agent also affects the labeling of such cocoa products. Such alkalized cocoa products are often labeled as being "processed with alkali." Thus, the presence of the alkalizing agent means such cocoa product cannot be considered "natural" and consumers are demanding "all natural" products which are typically lighter brown in color.

Thus, a growing need exists for cocoa products that possess the color of alkalized cocoa products, yet are considered "natural."

SUMMARY OF THE INVENTION

In each of various embodiments, the present invention helps fulfill these needs and discloses processes for producing "natural" cocoa products that have the color of alkalized cocoa products. Cocoa products produced by such methods are also disclosed.

In one embodiment, a process for producing a dark brown, natural cocoa product includes mixing cocoa cake and water, thus producing a mixture. Subjecting the mixture to an elevated pressure, and drying the mixture. The dark brown, natural cocoa product is not alkalized.

In a further embodiment, a natural, cocoa product has an L-value of between about 10 and about 15, an a-value of between about 4 and about 6.2, a b-value of between about 3.5 and about 6.0, and a pH of less than about 6.

DETAILED DESCRIPTION OF THE INVENTION

Figure 1:
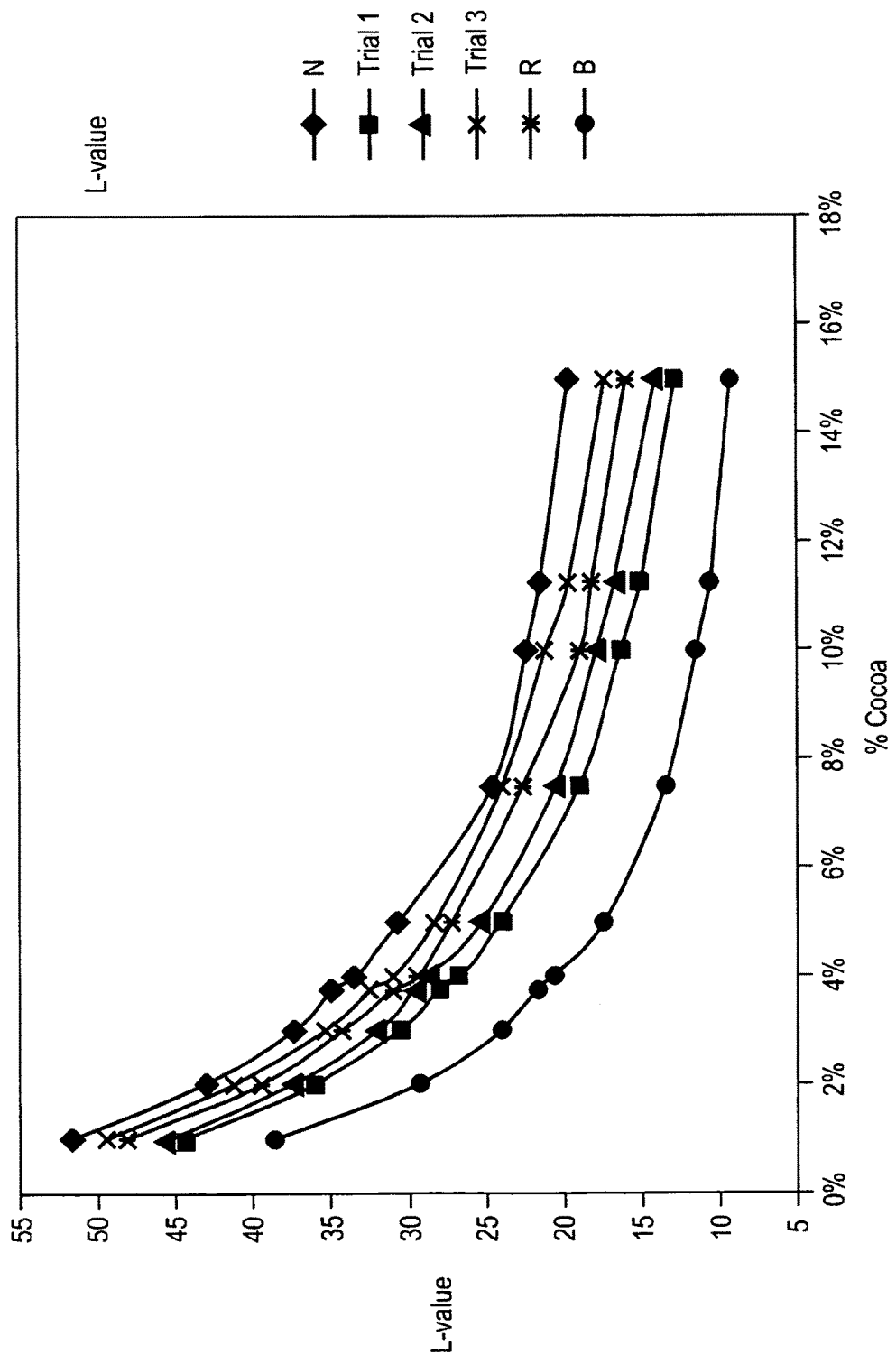
FIG. 1 shows the L-values of various embodiments of dark brown, natural cocoas of the present invention in a compound coating.

In one embodiment, dark, natural cocoa is produced. The dark, natural cocoa may be dark brown. The cocoa may be cocoa cake or cocoa powder.

In a further embodiment, a process for producing the dark, natural cocoas includes mixing cocoa cake with water, thus producing a mixture, subjecting the mixture to an elevated pressure, and/or drying the mixture. The moisture of the mixture may be between about 26% and about 35%. The water may also be heated to a temperature of less than about 125° C., a temperature of between about 85° C. and 120° C., or a temperature of about 190° F. to about 250° F.

In another embodiment, the mixture of the cocoa cake and the water may be subjected to pressure, such as between about 5 and about 25 psi. The mixture may be reacted at the pressure for a time of between about 30 and about 200 minutes. The mixture may be dried, such as at atmospheric pressure or under vacuum. The cocoa cake may also be ground into a cocoa powder, which may have a fineness of a minimum of 98% through a 200 mesh screen.

In an embodiment, the cocoa cake may be of a West African origin and in other embodiment, may be of other origins.

In yet an additional embodiment, the nibs, the de-shelled beans, or the combination thereof are sterilized.

In yet a further embodiment, the cocoa nibs, the de-shelled beans, or the combination thereof are ground, thus producing cocoa liquor. The cocoa liquor may be separated into cocoa butter and cocoa presscake, or the cocoa liquor may be defatted. The cocoa presscake may be further ground into cocoa powder.

In another embodiment, the natural cocoa products of the present invention may have a dark color which refers to cocoa products with an L-value less than about 15.0, 14.0, 13.0, 12.0, 11.0, 10.0, 9.0, 8.0, 7.0, 6.0, 5.0, 4.0, or lower, inclusive of intervals between those values. The L-value may also be between about 10 and about 15. The a-values may be between about 4 and about 6.2. The b-values may be between about 3.5 and about 6.5. The calculated C-values may be between about 5 and about 10. The calculated H-values may be between about 42 and about 49.

In yet an additional embodiment, a natural cocoa product of the present invention has a pH of less than about 6, between about 3 to about 6, a pH of between about 4.5 to about 6, or a pH of between about 5 to about 6.

In one embodiment, a starting material for the processes described herein may be de-shelled cocoa beans which refers to any suitable cocoa bean fraction/product having the shells substantially removed, broken, and/or winnowed. Non-limiting examples of de-shelled cocoa beans include, but are not limited to, nibs, kernels, and cotyledons. De-shelled cocoa beans typically contain a small fraction of contaminating shells that are within commercially acceptable tolerances since no de-shelling process is 100% complete.

In an additional embodiment, the cocoa beans used to produce the natural cocoa products of the present invention are good fermented. In a further embodiment, the cocoa beans used to produce the natural cocoa products of the present invention are under- or un-fermented.

In one embodiment, the natural cocoa products produced herein are suitable for many commercial purposes, including, without limitation, food products. Examples of food products include, but are not limited to, chocolate, dark chocolate, milk chocolate, semi-sweet-chocolate, baking chocolate, candies, pralines, truffles, candy bars, flavoring syrup, confectionary coatings, compound coatings, fillings, beverages, dairy products, milk, ice cream, beverage mixes, smoothies, soy milk, cakes, cheesecakes, cookies, pies, diet bars, meal-substitute solid foods and beverages, energy bars, chocolate chips, yogurt, yogurt drinks, pudding, mousse, mole, chocolates with lower bitterness, chocolate with fillings such as yogurt, and/or cheesecake.

A number of objective methods for measuring the color of cocoa products are known. In one method, the Hunter color system or CIE 1976 (CIELAB) and like systems, color may be described in terms of three parameters: Lightness (L)—the light or dark aspect of a color, where the lower the L-value, the darker the cocoa powder will appear; Chroma (C)—the intensity of a color by which one distinguishes a bright or gray color, where the higher the C-value, the brighter the powder will be; and Hue (H)—referring to color in daily speech, such as red, yellow, or blue. For cocoa powders, a low H value indicates a red color and a high H-value indicates a brown color.

The CIE 1976 color system describes colors in terms of coordinates L, "a*" and "b*". The L coordinate is consistent with the Value of Lightness, and from the a* and b* coordinates, the Chroma and Hue can be calculated as follows: $C^* = \sqrt{a^{*2} + b^{*2}}$; $H = \arctan(b^*/a^*)$.

The spectral color is the result of the source of light and the reflecting surface. For a good reproducible measurement of color, the source of light is standardized. There are two basic approaches for measuring color: visually or by instrumentation. There is a natural human tendency to trust only "one's own eyes." For this reason, colors are still frequently judged visually. To be able to do this in a reproducible manner, certain standard conditions should be met: the light source, for example and without limitation, a CIE standard light source; the positions of the sample, relative to the light source, which are preferably at an angle of 45° to each other; the background of the sample, uniform and preferably gray; the distance between the eyes and the sample and position of the eyes relative to the sample; and the size of the sample.

In practice, color cabinets are used with standard light sources for visual color determinations. Color meters and spectrophotometers are used for instrument color readings. Instrument color measurements were made in the Examples herein using 10 grams of a natural cocoa in 30 grams of water measured with a Hunterlab colorimeter. Unless otherwise indicated, the color values described in the Examples, and all reference herein to color values L, a and b are readings using the Hunterlab colorimeter. The color parameters described herein refer to the L, a, and b readings, and C values and H values were calculated. The color values recited herein are approximate in the sense that color measurements may vary from spectrophotometer-to-spectrophotometer, typically in the range of +/−0.5 for L, a, b, C, and H values.

The following examples illustrate various non-limiting embodiments of the compositions within the present disclosure and are not restrictive of the invention as otherwise described or claimed herein.

EXAMPLES

Example 1

Non-alkalized cocoa cake was treated with water at levels between 27 and 35%, at pressure levels of between 5 and 22 psi, and a treatment time of about 30 minutes. The treatments were carried out in an industrial size reactor typically used for cake alkalization processes. The conditions of the various trials are shown in Table 1.

TABLE 1

Cocoa cake treatment conditions.

| | Trial 1 | Trial 2 | Trial 3 |
|---|---|---|---|
| Amount of cake (lbs) | 17000 | 11000 | 11000 |
| Cake type | West African | West African | West African |
| Amount of water (lbs) | 6500 | 6000 | 4200 |
| Moisture (%) | 27.7 | 35.3 | 27.6 |
| Pressure (psi) | 22 | 22 | 5 |
| Max. temp. (F.) | 239 | 239 | 192 |
| Max. temp. (C.) | 115 | 115 | 89 |
| Time (minutes) | 30 | 30 | 30 |

After the treatment, the treated cocoa cake was dried under vacuum and ground into a fine powder. The fine powder was analyzed for: pH (in a 10% water solution); color in water (using Hunterlab at a 25% slurry of the powder in the water); color in milk (visually at a 4% solution of the powder in milk); for fineness (wet as determined by the percent through a 75 μm screen); and for flavor in hot water (using 4% of the powder, 5% sugar, and hot water). The pH, color, and fineness are shown in Table 2. Table 3 shows the pH and color value ranges of typical cocoa powders.

TABLE 2

Analytical results of treated cocoa cake.

|  | Trial 1 | Trial 2 | Trial 3 |
|---|---|---|---|
| pH | 5.7 | 5.4 | 5.4 |
| L | 11.24 | 12.12 | 14.52 |
| a | 4.43 | 5.07 | 6.01 |
| b | 4.28 | 4.96 | 6.27 |
| C (calculated) | 6.2 | 7.1 | 8.7 |
| H (calculated) | 44.01 | 44.37 | 46.21 |
| Fineness (% through 75 μm screen) | 98.88 | 98.57 | 98.09 |

TABLE 3 pH and color ranges of typical cocoa powders.

|  | Natural | Light alkalized | Medium alkalized | Red (alkalized) | Dark brown (alkalized) |
|---|---|---|---|---|---|
| pH | 5.7 | 7.2 | 7.6 | 8 | 8.1 |
| L | 22.1 | 17.42 | 15.54 | 13.18 | 9.77 |
| a | 10 | 9.42 | 8.8 | 7.85 | 4.24 |
| b | 9.88 | 7.84 | 6.91 | 5.72 | 3.23 |
| C (calculated) | 14.1 | 12.3 | 11.2 | 9.7 | 5.3 |
| H (calculated) | 44.79 | 39.77 | 38.14 | 36.08 | 37.3 |

The color values of Table 2 indicate a strong color development of the cocoa cake treated with water. Trials 1 and 2 show L values between that of a typical alkalized, red and typical alkalized, dark brown cocoa, and the L value of Trial 3 has an L value between that of an alkalized red and a medium, alkalized brown cocoa. The lower C value corresponds to a lower brightness and grayish hue. The H value did not change significantly during the water treatment indicating that the powder stayed brown and didn't show the red tones that are typical for alkalized cocoa powders. Overall, the color values show the natural, dark cocoa of the present invention are truly dark brown as compared to traditional natural cocoas. The observed color in milk confirms the results of the measured cocoa values.

The flavor of the dark, natural cocoas is significantly different from regular, natural cocoas and alkalized cocoas. Typical natural cocoas are acidic, astringent, bitter, may have some fruity notes, and may have some additional origin specific notes. In typical alkalized cocoas, the acidic notes of natural cocoas are replaced by an increased alkaline impact the overall cocoa impact becomes more intense and the astringency is reduced. The degree of alkalization determines the intensity of these notes.

The dark, natural cocoas of the present invention have a mild cocoa impact, show slight spicy, slight sour, and very slight astringent notes. Trial 2 had some roasted notes and Trial 1 had slightly more intense roasted notes. The natural, dark cocoas of the present invention are different from the flavor of traditional, natural cocoa or alkalized cocoa products. The color of the natural, dark cocoas of the present invention is also on the dark side of the overall color spectrum and may be mixed with a traditional, natural cocoa, such as at a ratio of 1 to 2 in order to create a color impact similar to that of a medium, alkalized cocoa, yet having the flavor of a natural cocoa.

Example 2

A compound coating was prepared using the dark, natural cocoa products of Example 1. The formulations in Table 4 were used to prepare a white base and a cocoa base.

TABLE 4

Formulations of white base and cocoa base.

|  | White base | Cocoa base |
|---|---|---|
| Sugar (%) | 70.44 | 55.44 |
| Fat, 95 PK (%) | 27.95 | 27.95 |
| Nonfat dry milk (%) | 1 | 1 |
| Soy lecithin (%) | 0.55 | 0.55 |
| Vanillin (%) | 0.06 | 0.06 |
| Cocoa (%) | 0 | 15 |

The cocoa powders used were a commercially available natural cocoa (N), a commercially available red cocoa (R), a commercially available black cocoa (B), the cocoa of Trial 1, the cocoa of Trial 2, and the cocoa of Trial 3 of Example 1. The white base and the cocoa base were mixed to create products having cocoa contents of between 1 and 15%. The L-values of the various products was evaluated and are shown in FIG. 1.

Figure 2:
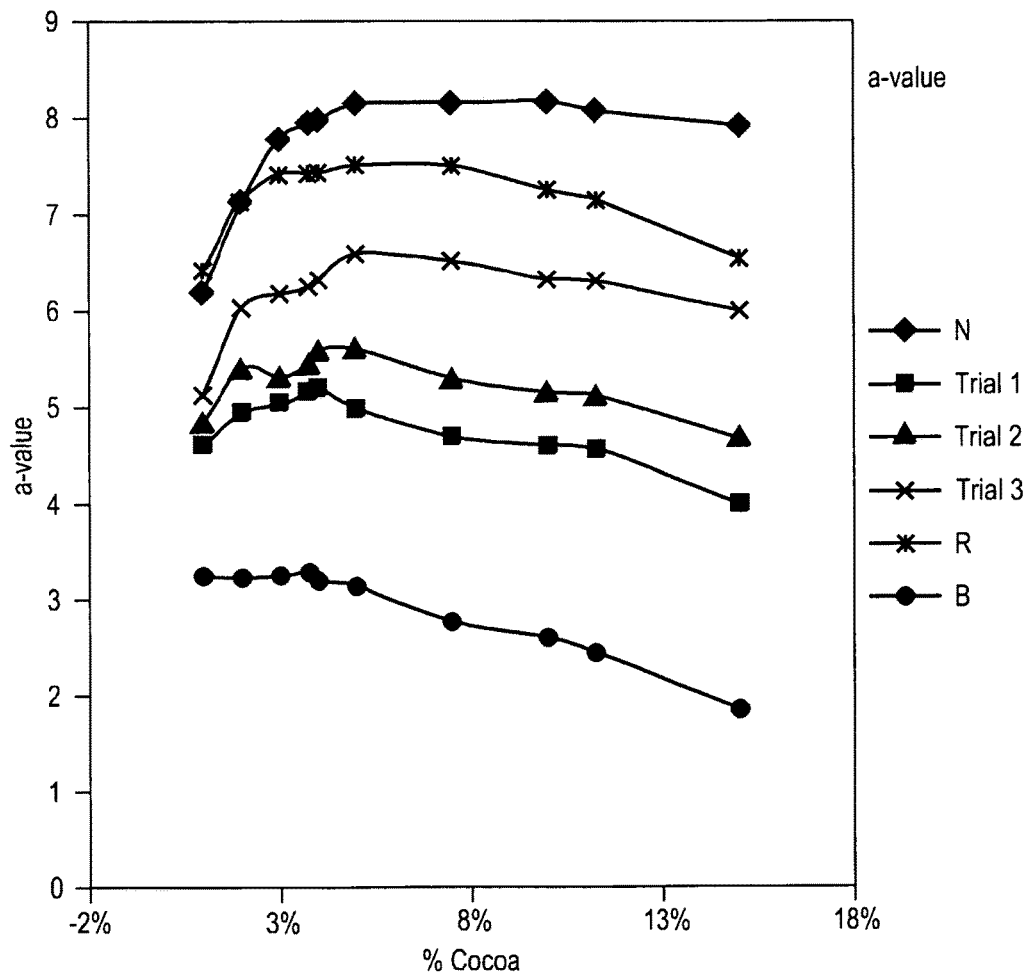
FIG. 2 shows the a-values of various embodiments of dark brown, natural cocoas of the present invention in a compound coating.
Figure 3:
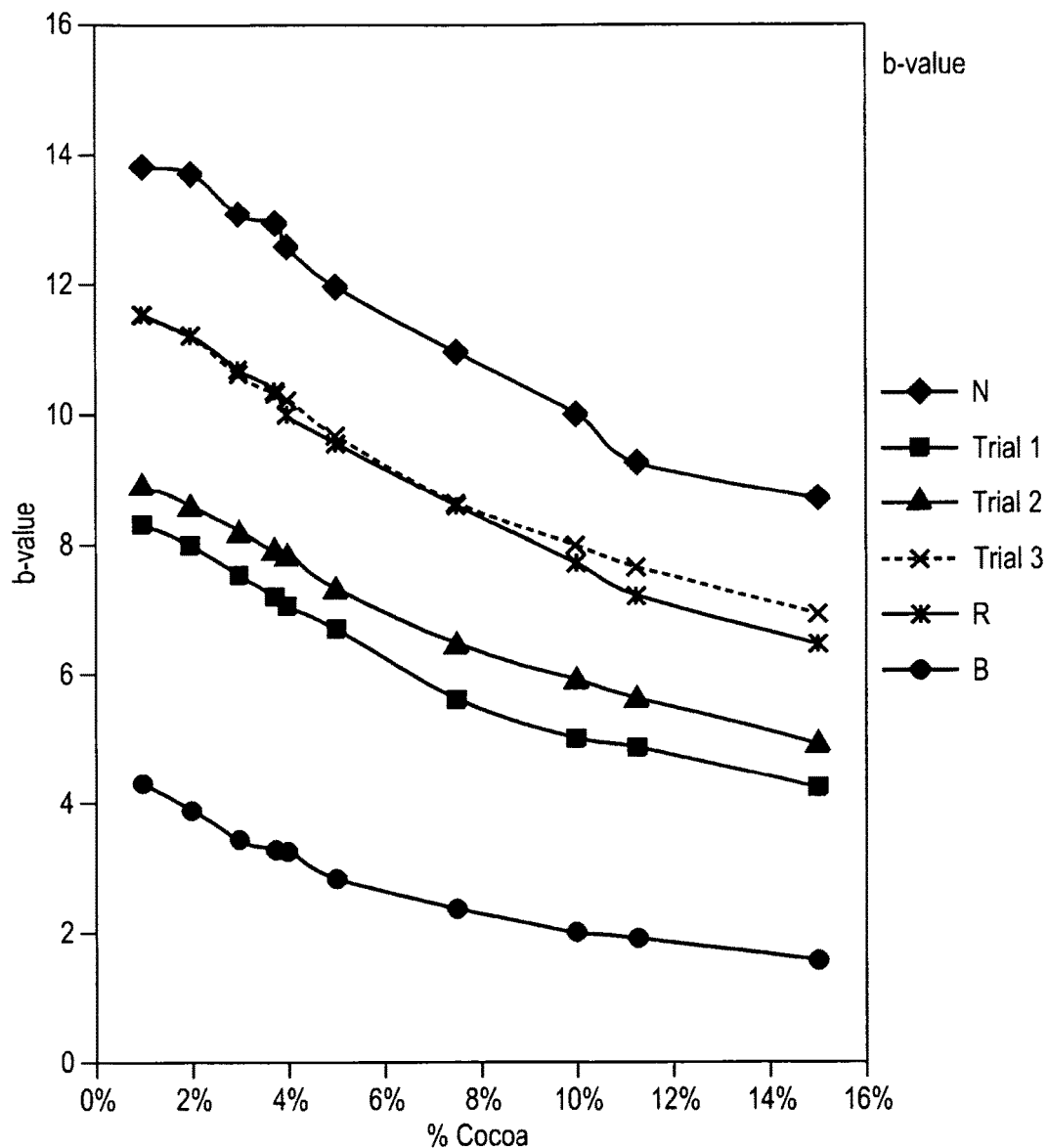
FIG. 3 shows the b-values of various embodiments of dark brown, natural cocoas of the present invention in a compound coating.

FIG. 1 shows the color strength in the compound coatings of the dark, natural cocoas as compared to coatings prepared with the commercially available natural cocoa (N), the commercially available red cocoa (R), and the commercially available black cocoa (B). The L-value of the compound coating with the cocoa of Trial 3 is between the coatings produced with the natural (N) and red (R) cocoa. Between 75-85% of the cocoa of Trial 3 is required to produce the same L value as the coating with the natural (N) cocoa. The L-value of the cocoa of Trial 2 in the coating is lower than the L-value of the red (R) cocoa in the coating, and between 60-80% of the Trial 2 cocoa is needed to achieve the same L-value in a coating as the natural (N) cocoa. The coating with the cocoa from Trial 1 is the darkest of the coatings produced with the dark, natural cocoas of Example 1, and between 50 and 70% of the cocoa of Trial 1 is needed to achieve the same L-value as the natural (N) cocoa in the coating.

a- and b-measurements were also taken of the compound coatings produced in this Example and are shown in FIG. 2 and FIG. 3, respectively. The a-values of the coatings including the dark, natural cocoas of Trials 1, 2, and 3 are lower than the a-value of the coatings having the red (R) cocoa and the natural (N) cocoa. The b-value of the coating including the cocoa of Trial 3 is almost the same as the coating having the red (R) cocoa and lower than the b-value of the coating with the natural (N) cocoa. The b-values for coatings having the dark, natural cocoas of Trials 1 and 2 are lower than the b-value of the coating having the red (R) cocoa.

The calculated C- and H-values show that the coatings having the dark, natural cocoas of Trials 1 and 2 are fairly similar in brightness and hue, while the coating with the cocoa of Trial 3 is less gray than the coatings with the cocoas of Trials 1 and 2. The three coatings with the dark, natural cocoas of Example 1 are dark brown, with no development of a red hue as typically seen with alkalized cocoas.

The data in this Example shows that in a compound coating, a lower amount of the dark, natural cocoa of the present invention is needed to achieve a certain L-value as compared to the commercially available natural (N) cocoa. This would be beneficial since a cost savings could be realized by using less cocoa when manufacturing a food containing such cocoa products.

Example 3

The flavors of compound coatings produced with the dark, natural cocoas of Example 1 were compared against a commercially available cocoa as the reference. The following blends were used: reference included 10% of a commercially available natural cocoa plus 5% of a commercially available red cocoa; Trial 1 included 10% of a commercially available natural cocoa plus 5% of the cocoa of Trial 1; Trial 2 included 10% of a commercially available natural cocoa plus 5% of the cocoa of Trial 2; and Trial 3 included 10% of a commercially available natural cocoa plus 5% of the cocoa of Trial 3. The three trials were tasted against the reference.

Figure 4:
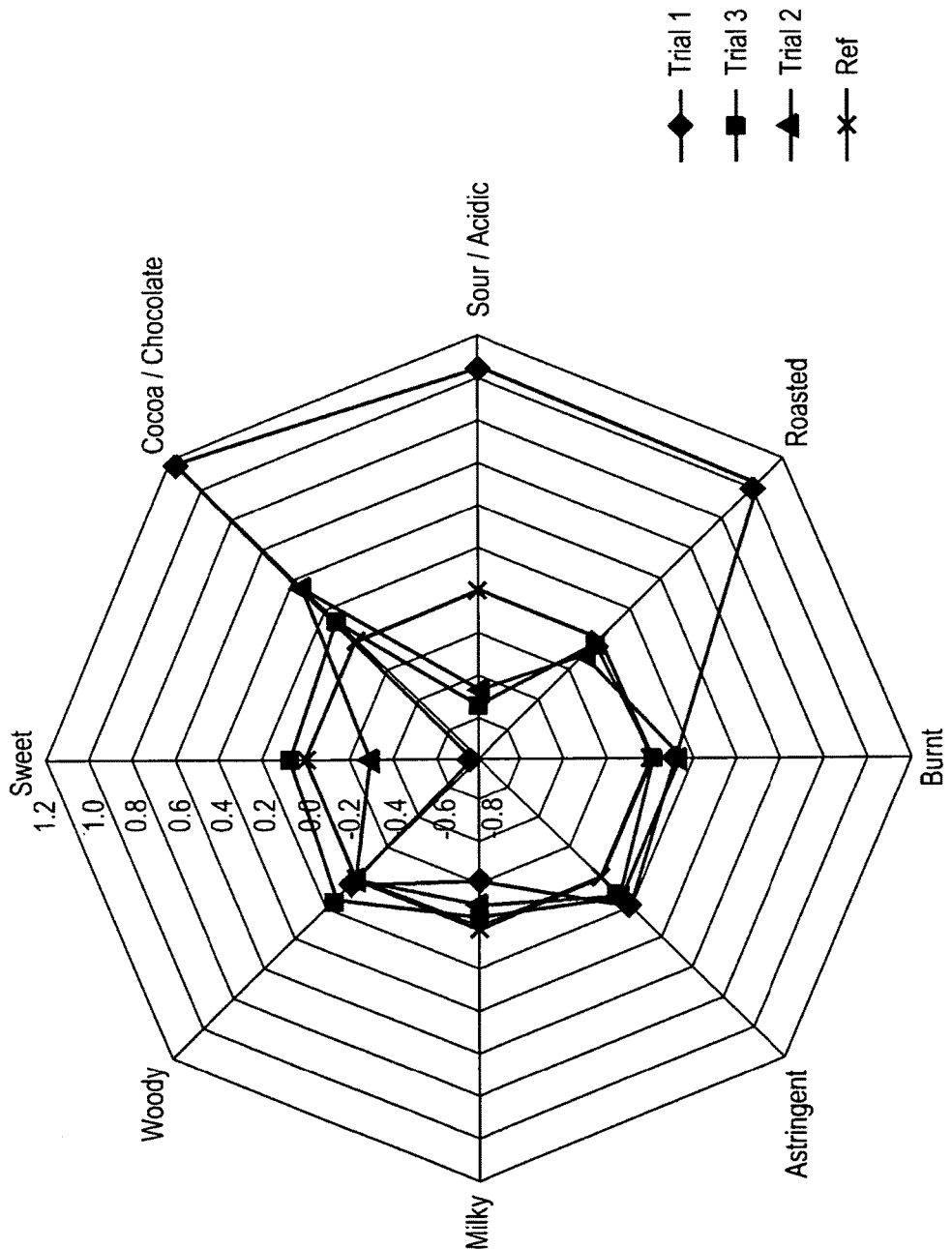
FIG. 4 shows a spider graph of a taste evaluation of compound coatings produced with various embodiments of dark brown, natural cocoas of the present invention.

A group of 17 experienced panelists were asked to use a scale ranging from −6 to +6 for a range of descriptors typical for compound coatings. The average of the evaluations was calculated and the results are presented in the spider graph of FIG. 4.

The blends including cocoas from Trials 2 and 3 scored very similar and except for the sour/acidic impact, were very similar to the reference coating including the reference cocoa. The blend including the cocoa from Trial 1 was less sweet and had a higher impact for cocoa/chocolate, sour/acidic, and roasted notes.

Example 4

The blends of Example 3 including the dark, natural cocoas of Trials 1, 2, and 3, a reference natural cocoa powder (Ref), and a reference natural cocoa powder mixed with a red cocoa (Red), and an all red cocoa were also tested in chocolate flavored cakes. The cakes were made using a conventional recipe and having 5.4% cocoa. The blends evaluated included ⅔ (3.6% of recipe) of a reference natural cocoa blended with a reference red cocoa or a dark, natural cocoa of Example 1, or 5.4% red cocoa.

All of the cakes evaluated in this Example had similar baking performances, height, and shapes. The only exception was the cake made with the reference natural cocoa, which had a lower height. The color of the cake with the cocoa of Trial 1 was the darkest and had more brown than reddish tones as compared to the reference blends. The cakes with the cocoas of Trials 2 and 3 were similar in color, darker, and more brown than one of the reference cocoas, and a bit lighter and more brown than the other reference cocoa.

Figure 5:
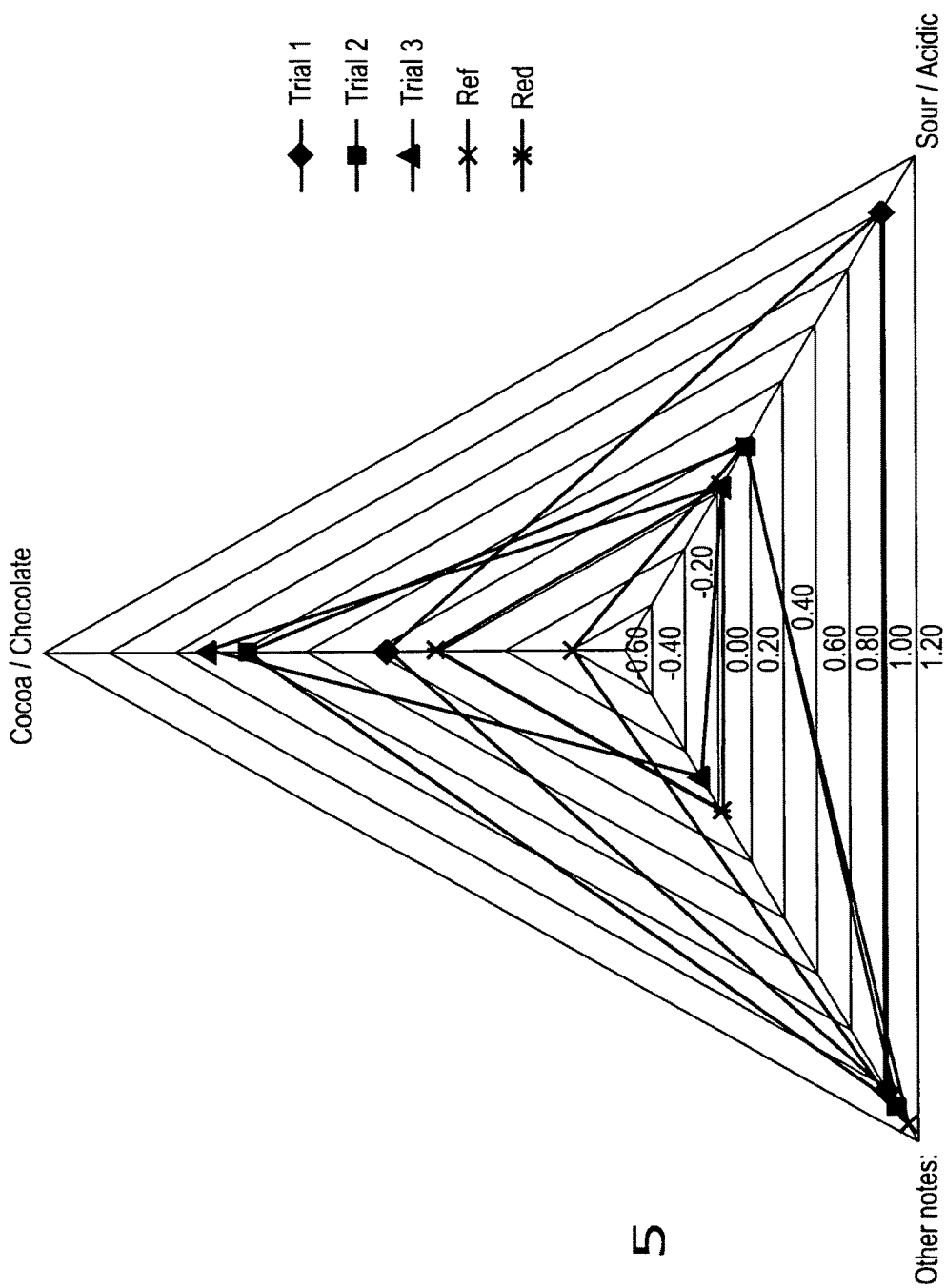
FIG. 5 shows a spider graph of a taste evaluation of cakes produced with various embodiments of dark brown, natural cocoas of the present invention.

The flavor of the cakes was evaluated with a group of seven experienced tasters. A spider graph of the results of the taste evaluate is shown in FIG. 5. The cake with the Ref blend cocoa (3.6% standard natural cocoa and 1.8% standard red cocoa) was more acidic and had some bitter and earthy notes not present in the Red blend. The cake with the cocoa of Trial 1 was more acidic, had notes of bitter, burnt, and woody not present in the Ref sample. The cake having the cocoa of Trial 2 had more chocolate notes than the Ref sample and also had spicy, wood, burnt, and fruity notes. The cake with the cocoa of Trial 3 has more chocolate notes, but was otherwise similar to the Ref sample.

The cocoa from Trial 1 was also used in a cookie and compared to cookies produced with cocoas of medium/red alkalization. The cookies produced with the cocoa of Trial 1 were more brown than the alkalized powders.

Example 5

The same blends of cocoas evaluated in the compound coatings of Example 3 (Trial 1, Trial 2, Trial 3, and Ref) were also evaluated in pudding and compared to lightly alkalized cocoa (LA). The pudding recipe used was: 1 package of JELL-O brand vanilla instant pudding; 3 cups of 2% milk; and 25 grams of cocoa (2.7% by weight). As seen in the previous examples, the cocoa of Trial 1 was darker and more brown than the Ref blend in the puddings. The cocoa of Trial 2 in the pudding was darker and more brown than the Ref blend in the pudding. The puddings produced with the cocoas of Trials 1 and 2 were clearly darker and more brown than the pudding produced with the lightly alkalized cocoa.

Figure 6:
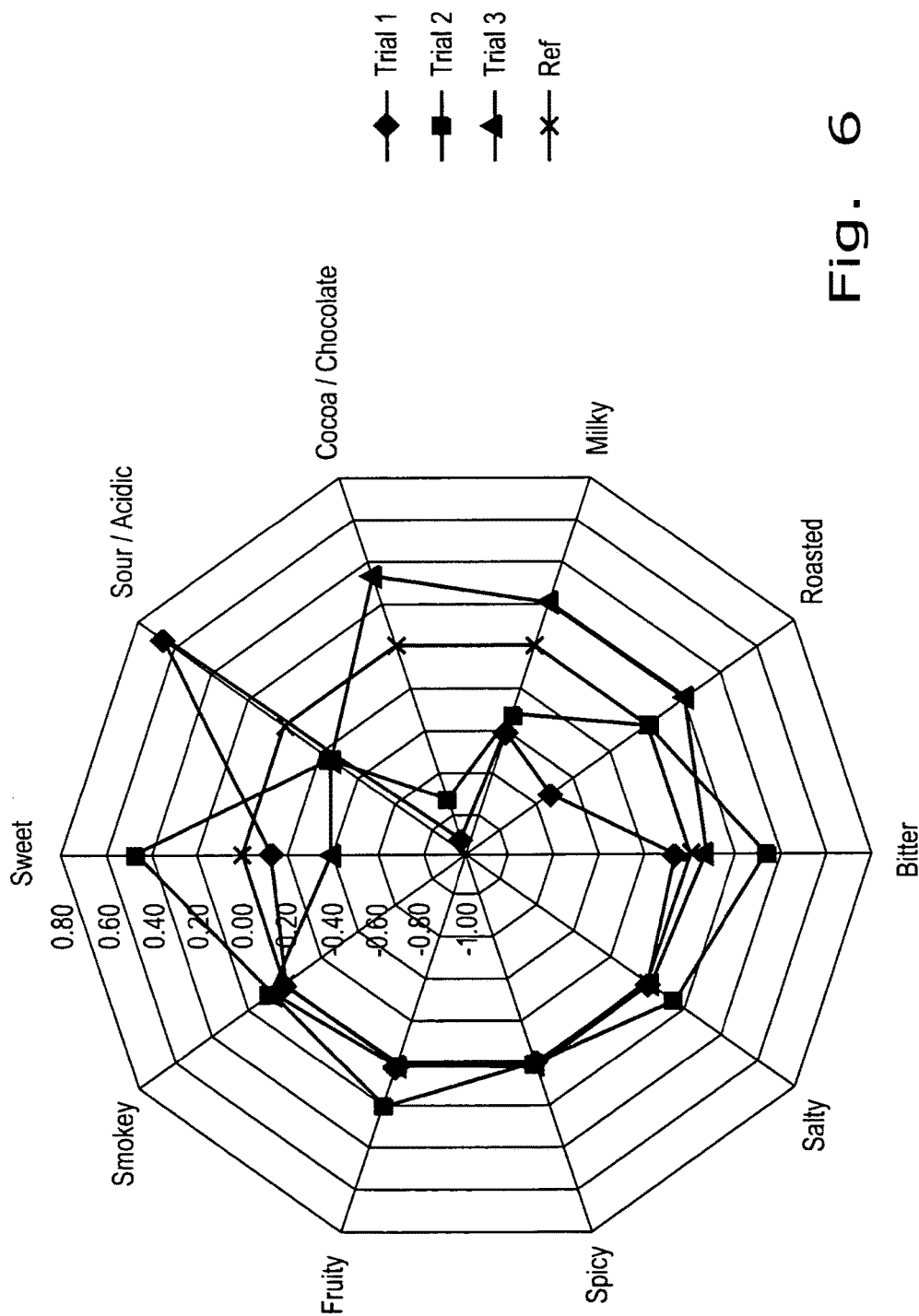
FIG. 6 shows a spider graph of a taste evaluation of puddings produced with various embodiments of dark brown, natural cocoas of the present invention.

Flavor evaluations were also performed in the puddings and the results are presented in the spider graph of FIG. 6. Consistent with the previous examples, the cocoa from Trial 1 in the pudding was more acidic and has less chocolate and milky notes than the Ref cocoa. The pudding with the cocoa of Trial 2 was sweeter and lower in cocoa/chocolate, milky, and roasted notes than the pudding with the Ref cocoa. The pudding with the Trial 3 cocoa was less sweet and more intense in chocolate and milky notes than the pudding with the Ref cocoa.

Example 6

The natural, dark cocoas of Example 1 were also evaluated in Greek yogurt. CHOBANI brand Greek yogurt was mixed with blends of a reference cocoa and the cocoas of Trials 1 and 2 at levels of 3% and 5% of the cocoa. In a couple of samples, 4% and 6% sugar was also added to compensate for the bitterness. The five samples evaluated included: 3% of a reference cocoa; 1.5% of the reference cocoa and 1.5% of the Trial 1 cocoa; 1.5% of the reference cocoa and 1.5% of the Trial 2 cocoa; 2% of the reference cocoa, 1% of the Trial 1 cocoa, and 4% sugar; and 2.6% of the reference cocoa, 1.3% of the Trial 1 cocoa, and 6% sugar. An evaluation of the various samples resulted in the last sample, 2.6% of the reference cocoa, 1.3% of the Trial 1 cocoa, and 6% sugar, being the favorite because of the color and pleasant chocolate flavor.

Example 7

Five samples of cocoas were prepared. A commercially available natural cocoa (Sample 1), a blend of ⅔ of the commercially available natural cocoa and ⅓ of a reference red cocoa (Ref), a blend of ⅔ of the commercially available natural cocoa and ⅓ of the natural, dark cocoa of Trial 2 (Sample 2), a blend of ⅔ of the commercially available natural cocoa and ⅓ of the natural, dark cocoa of Trial 1 Sample 3) were evaluated in ice cream. The ice cream was prepared using the following formulation: 315 ml of half & half; 315 ml of heavy whipping cream; 115 grams of sugar; 0.5 teaspoons of vanilla extract; and 15 grams of the cocoa samples. The ingredients were mixed, scraped, and frozen in an ice cream maker for about 30-40 minutes.

The ice creams made with the cocoas of Trials 1 and 2 were darker than the ice cream made with the reference mix, where the ice cream including the cocoa of Trial 1 was the darkest. The colors of the ice creams made with the cocoas of Trials 1 and 2 were similar to ice creams made with lightly, alkalized cocoas.

Figure 7:
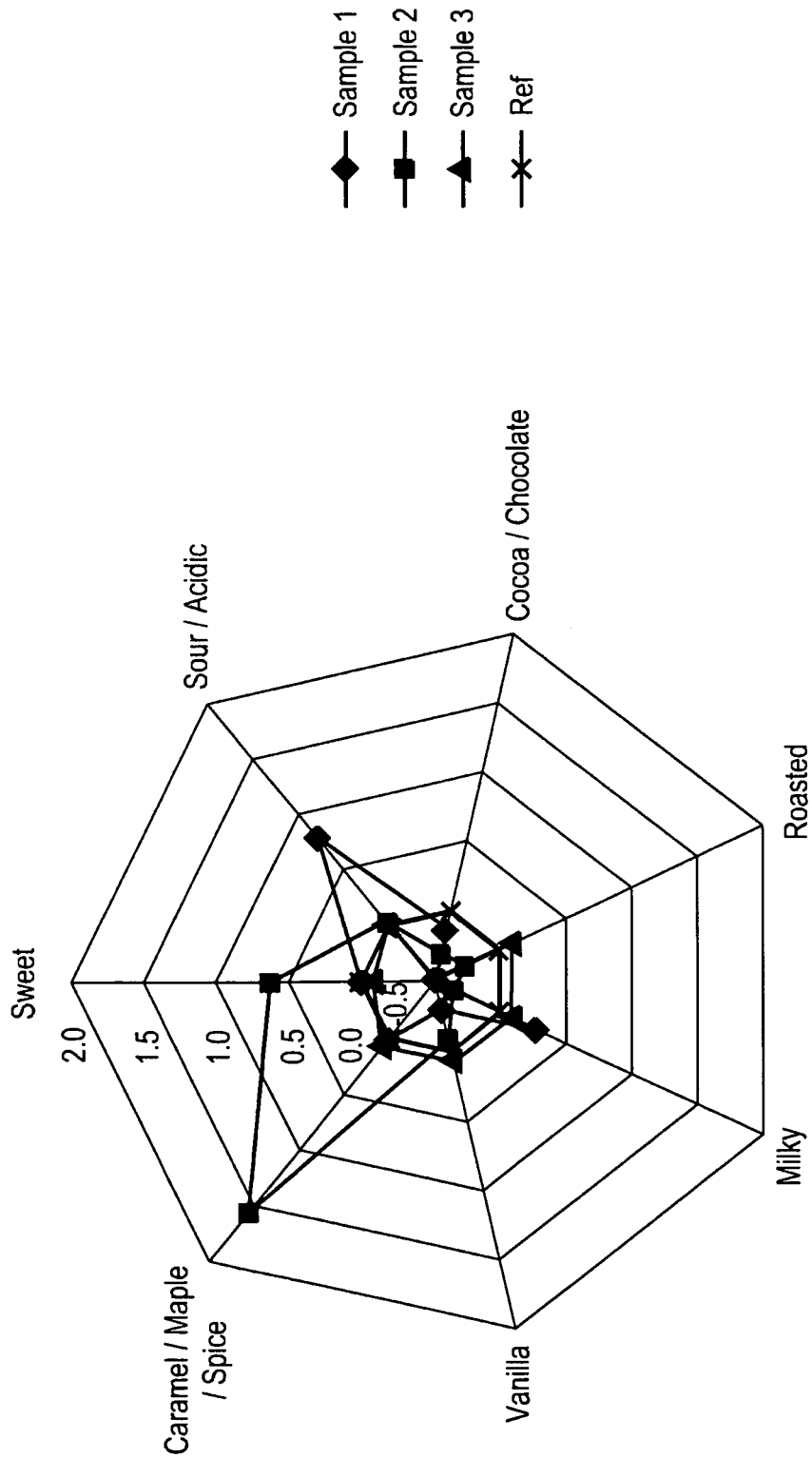
FIG. 7 shows a spider graph of a taste evaluation of ice creams produced with various embodiments of dark brown, natural cocoas of the present invention.

A sensory evaluation by a panel of 14 experienced tasters was performed with the ice creams prepared in this Example. A spider graph of the results of the evaluation is shown in FIG. 7. Ice cream made with the natural cocoa (Sample 1) was the most acidic, the ice cream made with the cocoa of Trial 2 (Sample 2) had prominent maple, caramel, and/or spice notes, and the ice cream made with the cocoa of Trial 1 (Sample 3) was a bit lower in chocolate/cocoa impact as compared to the rest of the ice creams.

This disclosure has been described with reference to certain exemplary embodiments, compositions and uses thereof. However, it will be recognized by those of ordinary skill in the art that various substitutions, modifications or combinations of any of the exemplary embodiments may be made without departing from the spirit and scope of the disclosure. Thus, the disclosure is not limited by the description of the exemplary embodiments, but rather by the appended claims as originally filed.

What is claimed is:

1. A process for producing a dark brown, natural cocoa product, comprising:
   mixing cocoa cake and water, thus producing a mixture;
   subjecting the mixture to pressure between about 5 psi and about 25 psi;
   drying the mixture, thus producing a dried cocoa cake; and
   grinding the dried cocoa cake into a dark brown, natural cocoa powder,
   wherein the dark brown, natural cocoa product is not alkalized,
   wherein the cocoa powder has an L value of less than about 15.0, and
   wherein the cocoa powder consists of cocoa.

2. The process of claim 1, wherein the mixture has a moisture content between about 27% and about 35%.

3. The process of claim 1, wherein the pressure is between about 5 and about 22 psi.

4. The process of claim 1, wherein the mixture is subjected to the pressure for a time of between about 20 and 40 minutes.

5. The process of claim 1, wherein the mixture is at a temperature of less than about 125° C.

6. The process of claim 1, wherein the mixture is at a temperature of between about 85° C. and 120° C.

7. The process of claim 1, further comprising:
   grinding cocoa nibs, de-shelled cocoa beans, or a combination thereof, thus producing cocoa liquor; and
   pressing the cocoa liquor, thus producing cocoa butter and the cocoa cake.

8. The process of claim 7, further comprising roasting the cocoa nibs, the de-shelled cocoa beans, or the combination thereof.

9. The process of claim 1, further comprising mixing the dark brown, natural cocoa powder with another cocoa powder.

10. The process of claim 1, wherein the cocoa powder has a fineness of a minimum of 98% through a 200 mesh screen.

11. The process of claim 1, wherein the cocoa powder has a pH of less than about 6.

12. A process for producing a dark, natural cocoa powder, comprising:
    mixing cocoa cake and water, thus producing a mixture;
    subjecting the mixture to pressure between about 5 psi and about 25 psi and a temperature of between about 85° C. and 120° C.;
    drying the mixture, thus producing a dried cocoa cake; and
    grinding the dried cocoa cake into a dark brown, natural cocoa powder;
    wherein said process for producing the dark brown, natural cocoa powder does not include alkalization,
    wherein the cocoa powder has an L value of less than about 15.0 and a pH of less than about 6, and
    wherein the cocoa powder consists of cocoa.

* * * * *